(12) United States Patent
Bailly et al.

(10) Patent No.: US 8,393,988 B2
(45) Date of Patent: Mar. 12, 2013

(54) TRANSMISSION DEVICE FOR A VEHICLE

(75) Inventors: Gerhard Bailly, Friedrichshafen (DE); Thomas Ratzmann, Meckenbeuren (DE); Karl Grad, Ruderting (DE); Jurgen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 496 days.

(21) Appl. No.: 12/679,517

(22) PCT Filed: Aug. 15, 2008

(86) PCT No.: PCT/EP2008/060752
§ 371 (c)(1),
(2), (4) Date: Mar. 23, 2010

(87) PCT Pub. No.: WO2009/047032
PCT Pub. Date: Apr. 16, 2009

(65) Prior Publication Data
US 2010/0197437 A1 Aug. 5, 2010

(30) Foreign Application Priority Data

Oct. 2, 2007 (DE) .................. 10 2007 047 194
Jul. 16, 2008 (DE) .................. 10 2008 040 446

(51) Int. Cl.
*F16H 47/04* (2006.01)
(52) U.S. Cl. ........................................... 475/83
(58) Field of Classification Search ............. 475/72–75, 475/80, 83, 207
See application file for complete search history.

(56) References Cited

U.S. PATENT DOCUMENTS

| | | | |
|---|---|---|---|
| 2,583,656 A | 1/1952 | Lay | |
| 2,808,737 A | 10/1957 | Bullard, III | |
| 3,023,638 A | 3/1962 | Westbury et al. | |
| 3,204,486 A | 9/1965 | Lalio | |
| 3,212,358 A | 10/1965 | Lalio | |
| 3,580,107 A | 5/1971 | Orshansky, Jr. | |
| 3,601,981 A | 8/1971 | Ifield | |
| 3,626,787 A | 12/1971 | Singer | |
| 3,714,845 A | 2/1973 | Mooney, Jr. | |
| 3,834,164 A | 9/1974 | Ritter | |
| 4,019,404 A | 4/1977 | Schauer | |
| 4,121,479 A | 10/1978 | Schauer | |
| 4,434,681 A | 3/1984 | Friedrich et al. | |
| 4,446,756 A * | 5/1984 | Hagin et al. | 475/75 |
| 4,471,669 A * | 9/1984 | Seaberg | 475/24 |
| 4,563,914 A | 1/1986 | Miller | |
| 4,776,233 A | 10/1988 | Kita et al. | |
| 4,813,306 A | 3/1989 | Kita et al. | |

(Continued)

FOREIGN PATENT DOCUMENTS

AT 197 650 B 10/1957
DE 1 069 978 11/1959

(Continued)

*Primary Examiner* — David D Le
*Assistant Examiner* — Huan Le
(74) *Attorney, Agent, or Firm* — Davis & Bujold, PLLC

(57) ABSTRACT

A transmission device for a vehicle (1) having a variator (3), which is configured as a hydrostatic device, of a transverse axial construction that can be adjusted at least in the region of a pivot axis (11), a planetary gear set (4) and a manual gear unit (9). The orientation of the pivot axis (11) of the variator (3), following installation in the vehicle, at least approximately corresponds to the orientation of a vehicle vertical axis (16).

17 Claims, 6 Drawing Sheets

U.S. PATENT DOCUMENTS

| | | | |
|---|---|---|---|
| 4,976,664 A | 12/1990 | Hagin et al. | |
| 5,071,391 A | 12/1991 | Kita | |
| 5,421,790 A | 6/1995 | Lasoen | |
| 5,584,772 A * | 12/1996 | Hayd | 475/72 |
| 5,643,122 A | 7/1997 | Fredriksen | |
| 5,667,452 A | 9/1997 | Coutant | |
| 5,766,107 A | 6/1998 | Englisch | |
| 5,868,640 A | 2/1999 | Coutant | |
| 5,890,981 A | 4/1999 | Coutant et al. | |
| 6,029,542 A | 2/2000 | Wontner | |
| 6,056,661 A | 5/2000 | Schmidt | |
| 6,485,387 B1 | 11/2002 | Goodnight et al. | |
| 6,592,485 B2 | 7/2003 | Otten et al. | |
| 6,761,658 B1 | 7/2004 | Stettler, Jr. | |
| 7,097,583 B2 | 8/2006 | Lauinger et al. | |
| 7,354,368 B2 | 4/2008 | Pollman | |
| 7,448,976 B2 | 11/2008 | Hiraki et al. | |
| 2002/0042319 A1 | 4/2002 | Otten et al. | |
| 2003/0089107 A1 | 5/2003 | Tani | |
| 2003/0150662 A1 | 8/2003 | Tani | |
| 2003/0166430 A1 | 9/2003 | Folsom et al. | |
| 2004/0242357 A1 | 12/2004 | Ishizaki | |
| 2006/0094554 A1 | 5/2006 | Schmidt | |
| 2006/0276291 A1 | 12/2006 | Fabry et al. | |
| 2007/0142168 A1* | 6/2007 | DeMarco | 477/41 |
| 2007/0277520 A1 | 12/2007 | Gollner | |
| 2007/0281815 A1* | 12/2007 | Gollner | 475/72 |
| 2008/0085801 A1* | 4/2008 | Sedoni et al. | 475/72 |
| 2008/0103006 A1 | 5/2008 | Pollman et al. | |
| 2008/0127758 A1* | 6/2008 | Gitt | 74/329 |
| 2008/0214349 A1 | 9/2008 | Liebherr et al. | |
| 2008/0214351 A1 | 9/2008 | Katayama et al. | |
| 2009/0270212 A1 | 10/2009 | Ueda et al. | |
| 2010/0056318 A1 | 3/2010 | Glockler | |

FOREIGN PATENT DOCUMENTS

| | | |
|---|---|---|
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 19954894 A1 * | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

TRANSMISSION DEVICE FOR A VEHICLE

This application is a National Stage completion of PCT/EP2008/060752 filed Aug. 15, 2008, which claims priority from German patent application serial no. 10 2007 047 194.9 filed Oct. 2, 2007 and German patent application serial no. 10 2008 040 446.2 filed Jul. 16, 2008.

FIELD OF THE INVENTION

The present invention relates to a transmission device for a vehicle.

BACKGROUND OF THE INVENTION

A hydrostatic-mechanical tractor transmission with a continuously variable hydrostatic drive train is known from DE 10 2006 025 348 A1. The hydrostatic drive train has a hydrostatic pump driven by an internal combustion engine and a hydraulic motor driven by the pump. The pump and the hydraulic motor are forcibly coupled via a single, common pivoting part and can be adjusted such that the pump is pivoted between a minimum angle and a maximum angle, while the motor synchronously pivots from a maximum pivot angle to a minimum angle at the same time. The pump is designed for only one conveying direction. A mechanical range transmission with several shift steps, which can be shifted via a clutch, is provided downstream.

Furthermore, a transmission device comprising a power split unit is known from DE 19 52 966 A which has a variator, a double planetary gear set and a manual transmission device to implement the drive ranges. The pump and motor means of the variator configured as a hydrostatic device can be adjusted via a common yoke.

SUMMARY OF THE INVENTION

The underlying object of the present invention is to further develop the transmission devices known from the prior art such that thrust forces resulting from shock-type loads, which, for example, occur when driving over bumpy road, potholes and the like, and acting on the variator causing an undesired autonomous adjustment of the variator, can be reduced and/or prevented in a simple and cost-effective manner.

The transmission device for a vehicle according to the present invention is configured with an adjustable variator designed as a hydrostatic device in a transverse axis construction that can be adjusted at least in the region of the pivot axis, a planetary gear unit and a manual gear unit.

According to the present invention, in the installation position the orientation of the pivot axis of the variator at least approximately corresponds to the orientation of a vehicle vertical axis, whereby the thrust forces resulting from shock-type loads and acting on the variator can be prevented in a constructively simple and cost-effective manner. In the transmission device according to the present invention, the adjustment direction and/or pivot axis of the variator can essentially be orientated vertically to the effective direction of the forces resulting from the shock-type loads and acting on the variator during operation, as a result of which the forces do not cause autonomous adjustments of the variator and consequently of the entire transmission ratio of the transmission device.

In an advantageous further development of the transmission device according to the present invention, the variator is arranged when installed between a main engine of the vehicle and the planetary gear unit as well as the manual gear unit.

Thus, the variator can be easily removed from a vehicle by pulling out the variator in the forward driving direction if no lateral access to the transmission housing is available. Moreover, the variator can also easily be removed from the underside of the vehicle if a corresponding access is available without additional disassembly of the vehicle parts or tilting the vehicle cabin.

In a further advantageous embodiment characterized by less installation space requirements in the axial direction, the variator is arranged in the installation position relative to the direction of travel of the vehicle next to the planetary gear unit and/or the manual gear unit, wherein the variator can easily be removed, provided the corresponding access is available, by pulling the variator out of a plug connection or out of tooth systems connecting the variator with other transmission components.

In embodiments of the transmission device according to the present invention requiring little installation space in the radial direction, the variator is either arranged between the planetary gear set and the manual gear unit, or the manual gear unit is arranged between the planetary gear set and the variator.

In an advantageous further development of the transmission device according to the present invention, in the region of its first shaft and in the region of its second shaft, the variator is respectively connected via an angle drive to a shaft of the planetary gear unit, whereby the variator can be connected to the power flow of the transmission device in a simple and cost-effective manner compared to spur gear teeth with smaller spur teeth.

Likewise, constructively simple and cost-effective embodiments of the transmission device according to the present invention are either configured with at least one motor means configured as a unit gear and at least one pump means configured as an adjusting unit, or with at least one pump means configured as a unit gear and at least one motor means configured as an adjusting unit.

In order to design the transmission ratio ranges of the transmission device with a spread as large as possible, an advantageous embodiment of the transmission device according to the present invention is provided with motor means and pump means configured as adjusting units in the region of the variator, whereby the pump means and the motor means can be adjusted independently of one another depending on the respective application, or coupled to one another for joint adjustments.

Further advantages and favorable embodiments of the present invention will be apparent from the claims and the exemplary embodiments described below in principle with reference to the drawings, whereas in the description of the different exemplary embodiments the components identical in construction and function carry the same reference numerals for the sake of clarity.

DETAILED DESCRIPTION OF THE PREFERRED EMBODIMENTS

Figure 1:
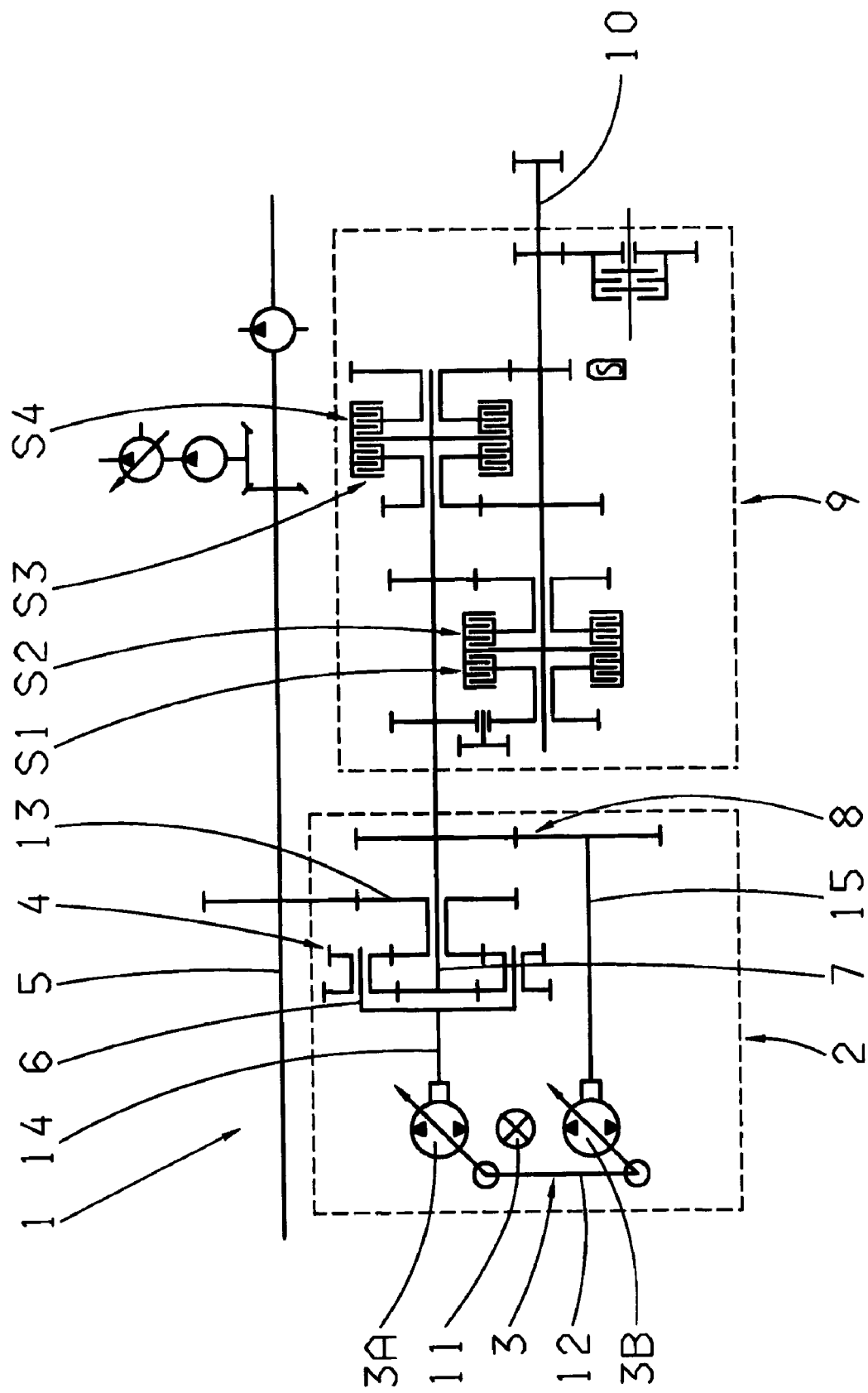
FIG. 1 a gear diagram of a first exemplary embodiment of the transmission device according to the present invention.

FIG. 1 shows a gear diagram of a transmission device 1 for continuously variable adjustment of the transmission ratio which can be used, for example, in agricultural vehicles. In the present description, three transmission ratio ranges and/or driving ranges for forward driving and one transmission ratio range for reverse driving can be implemented by means of the transmission device 1, and within the ranges the transmission ratio of the transmission device can be continuously adjusted.

The continuous adjustment of the transmission ratio is made possible by a drive set 2 comprising a variator 3 and a planetary gear set 4. By means of the planetary gear set 4 continuous adjustment of the rotational speed of the variator 3 is superposed to the only somewhat adjustable rotational speed of a transmission input shaft 5 which is coupled to a main engine of a vehicle. As a result of this superposition, two shafts 6, 7 of the planetary gear set 4 continuously variable rotational speeds are available in the region of the planetary gear set 4, the first shaft 6 being configured as a planet carrier of the planetary gear set 4 and coupled to an adjustable pump means 3A of the variator 3. The second shaft 7 is a sun gear of the planetary gear unit 4, which is operatively connected via a spur gear tooth system 8 to an adjustable motor means 3B of the variator 3. The pump means 3A and the motor means 3B of the variator configured as a hydrostatic device are each configured in a transverse axial construction and can be pivoted in the region of a pivot axis 11 via a common yoke 12.

The continuously variable drive set 2 is coupled to a manual gear unit 9, which is configured subject to the power of the variator 5 and also subject to the constructive embodiment of the planetary gear set 4. The power of the continuously variable drive set 2 is transmitted in the direction of a transmission output shaft 10 via the manual gear unit 9. Moreover, the output rotational speeds required in the region of the manual gear unit 9 are implemented in the different transmission ratio ranges.

The manual gear unit 9 is configured with four frictionally engaging shifting elements S1 to S4, the reverse driving range being engaged in the transmission device 1 when the first shift element S1 is engaged. The shift elements S2 to S4 are provided to implement the three forward driving ranges.

A second sun gear 13 of the planetary gear set 4 is connected to the transmission input shaft 5. The variator shafts 14 and 15 are thus each coupled to a shaft 6, 7 of the planetary gear set 4 which have no direct connection to the transmission input shaft 5. Furthermore, the variator shafts 14 and 15 are arranged axially parallel to the shaft 6, 7 of the planetary gear unit 4.

Figure 2:
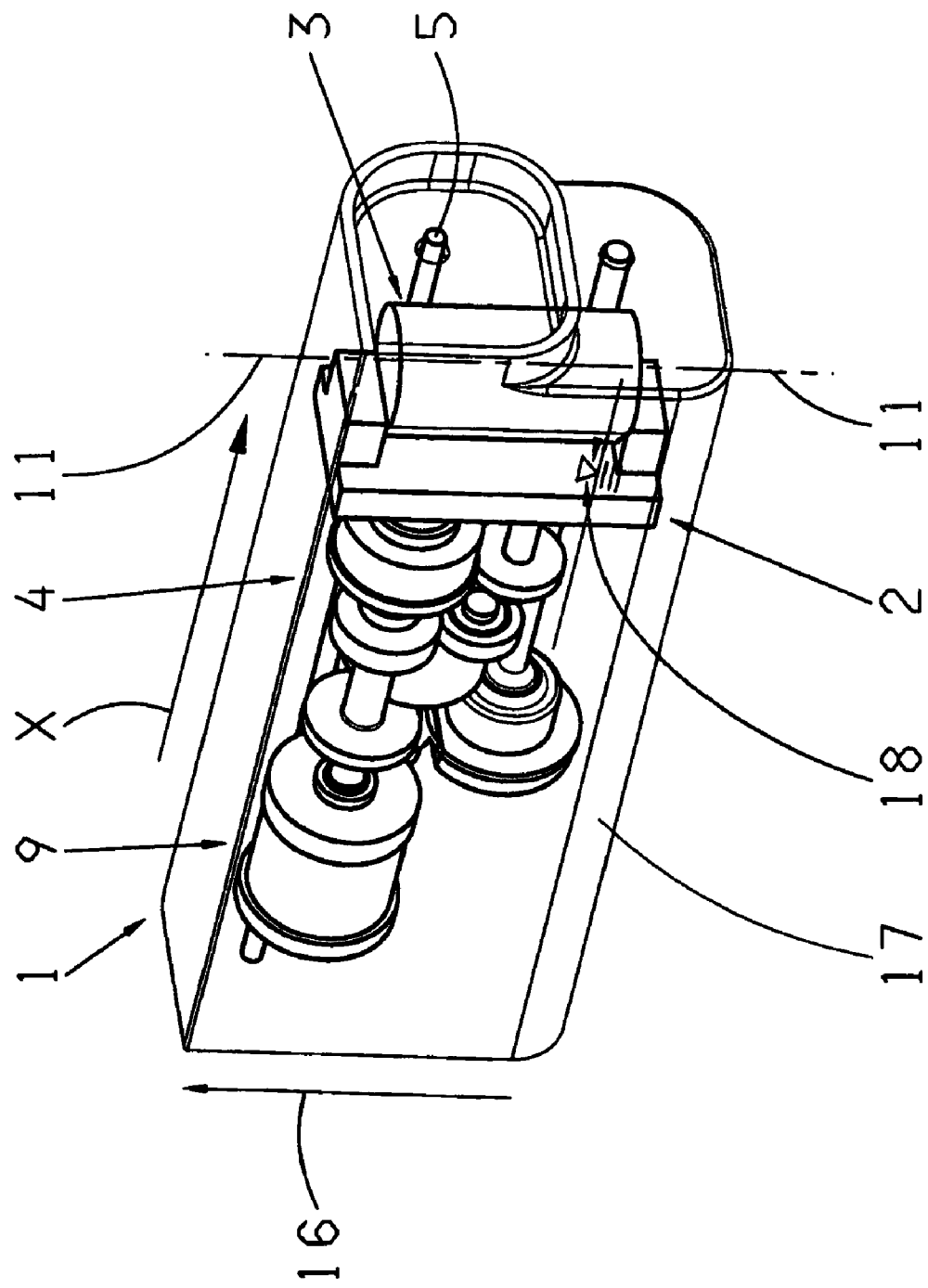
FIG. 2 a schematic three-dimensional lateral view of the transmission device according to FIG. 1.

In order to prevent, for a short time at least, the thrust forces caused by shock-type loads, as, for example, when driving over bumpy road, potholes and the like, adjusting autonomously and acting on the variator 3 and on the yoke 12 of the variator 3, the orientation of the pivot axis 11 of the variator 3 in the installation position in the vehicle shown in FIG. 2 at least approximately corresponds to the orientation of a vehicle vertical axis 16. In this way, the effective direction of the operational forces acting on the variator is essentially orientated vertically to the pivot axis 11 of the variator 3, so that therefore the forces do not adjust the variator 3 and/or its pump means 3A and/or its motor means 3B.

In addition, in the forward driving direction of the vehicle is indicated in more detail with an arrow X in FIG. 2, the variator 3 is arranged ahead of the planetary gear set 4 and the manual gear unit 9. The transmission device 1 is, on the one hand, characterized in the radial direction by requiring less installation space, and, on the other hand, by a greater axial length. Owing to its anterior arrangement in the forward driving direction X, the variator 3 is additionally easy to remove from a vehicle frame 17, wherein, depending on the respective design of the vehicle, the variator 3 can be removed forward with respect to a vehicle front axle, downward with respect to an upper side of the vehicle, or upward in the direction of the vehicle vertical axis 16, the vehicle frame 17, besides other vehicle components, limiting the installation space available in the vehicle for the transmission device 1.

If, as in the present case, the variator 3 is at least in part arranged below an oil level 18 of the transmission device 1, the variator 3 should be sealed off by adequate sealing means from the hydraulic fluid in an oil sump (not shown in more detail) of the transmission device 1 in order to easily prevent so-called churning losses during operation of the transmission device 1, and thus an impairment of the overall efficiency of the transmission device 1

Figure 3:
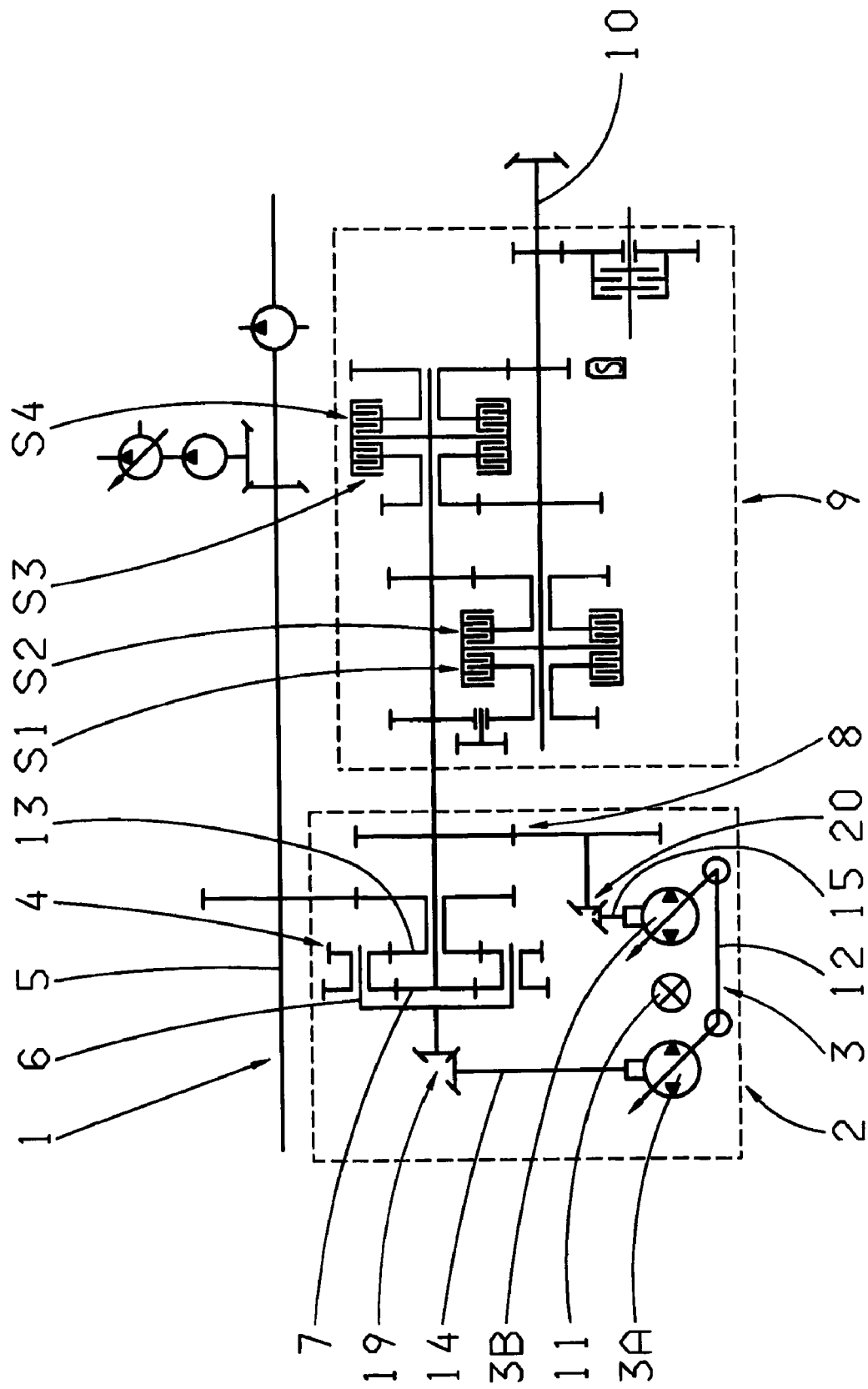
FIG. 3 a gear diagram of a second exemplary embodiment of the transmission device according to the present invention.
Figure 4:
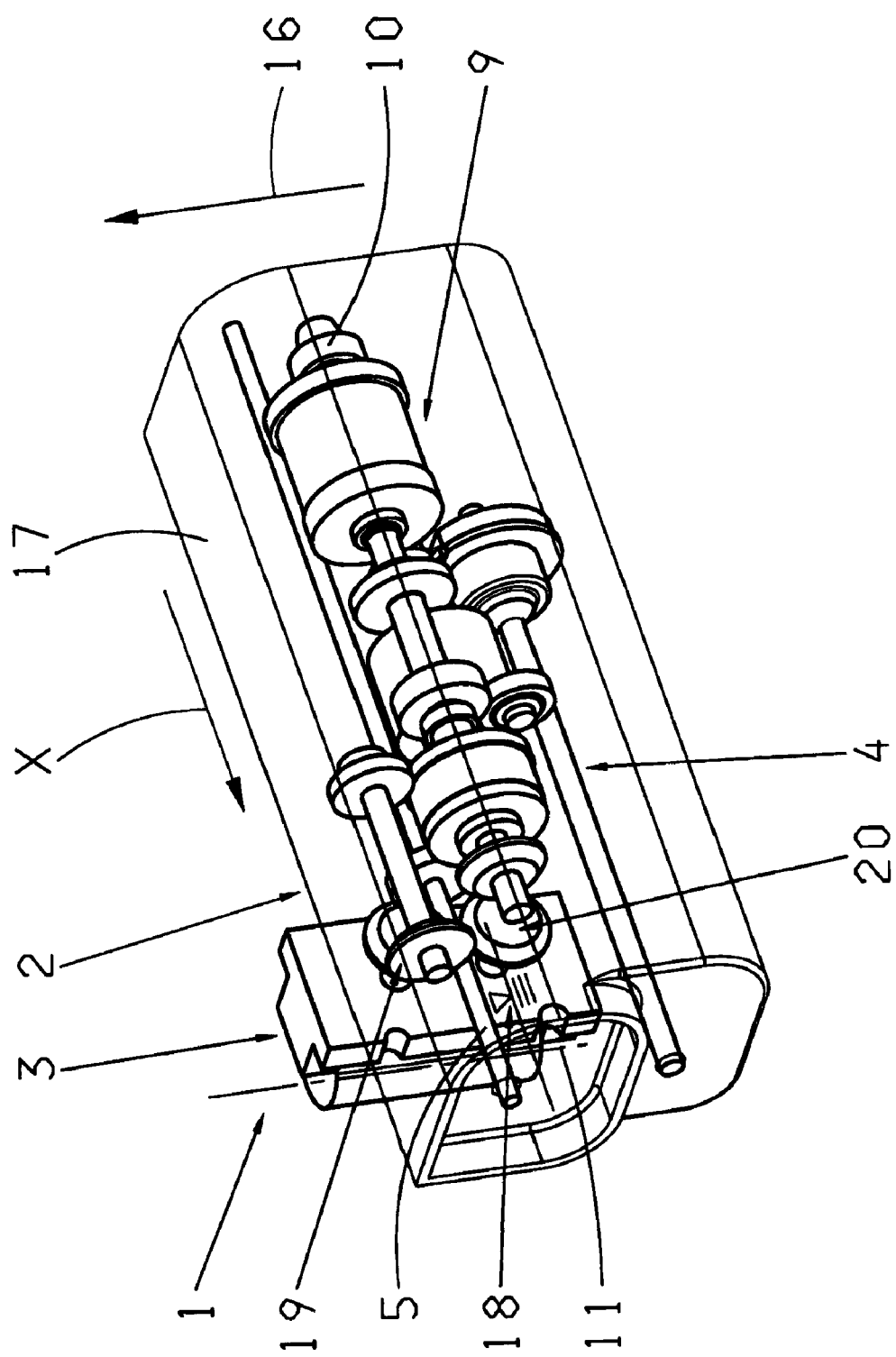
FIG. 4 a schematic three-dimensional lateral view of the transmission device according to FIG. 3.

FIG. 3 shows a gear diagram of a second exemplary embodiment of the transmission device 1, in which both variator shafts 14 and 15 are each connected to the shafts 6 and 7 of the planetary gear set 4 via so-called angle drives 19 and 20, the angle drives 19, 20 each being formed by bevel gears and/or bevel gear systems meshing with one another. Furthermore, the variator shafts 14 and 15 are arranged at right angles to the shafts 6 and 7 of the planetary gear set 4. The connection of the variator 3 to the planetary gear set 4 via both angle drives 19 and 20, easily allows east arrangement of the variator 3 in the position indicated in FIG. 4 next to the planetary gear set 4 with vertical orientation of the pivot axis 11 of the variator 3. In this way, the thrust forces resulting from shock-type loads acting on the yoke 12, and thus autonomous adjustments of the variator 3 are prevented.

Compared to the exemplary embodiment shown in FIG. 1 and FIG. 2, in which the variator 3 is connected to the shafts 6, 7 of the planetary gear set 4 via spur gear teeth, the second exemplary embodiment of the transmission device 1 requires a smaller axial installation space. In addition, during removal, the variator 3 can be laterally pulled out of a plug connection and the bevel gears of the angle drives 19 and 20 with little effort without previously having to disassemble other vehicle components.

Depending on the respective application, according to the arrangement shown in FIG. 1 and FIG. 2, it is, however, also possible to connect the variator to the planetary gear set via angle drives.

Figure 5:
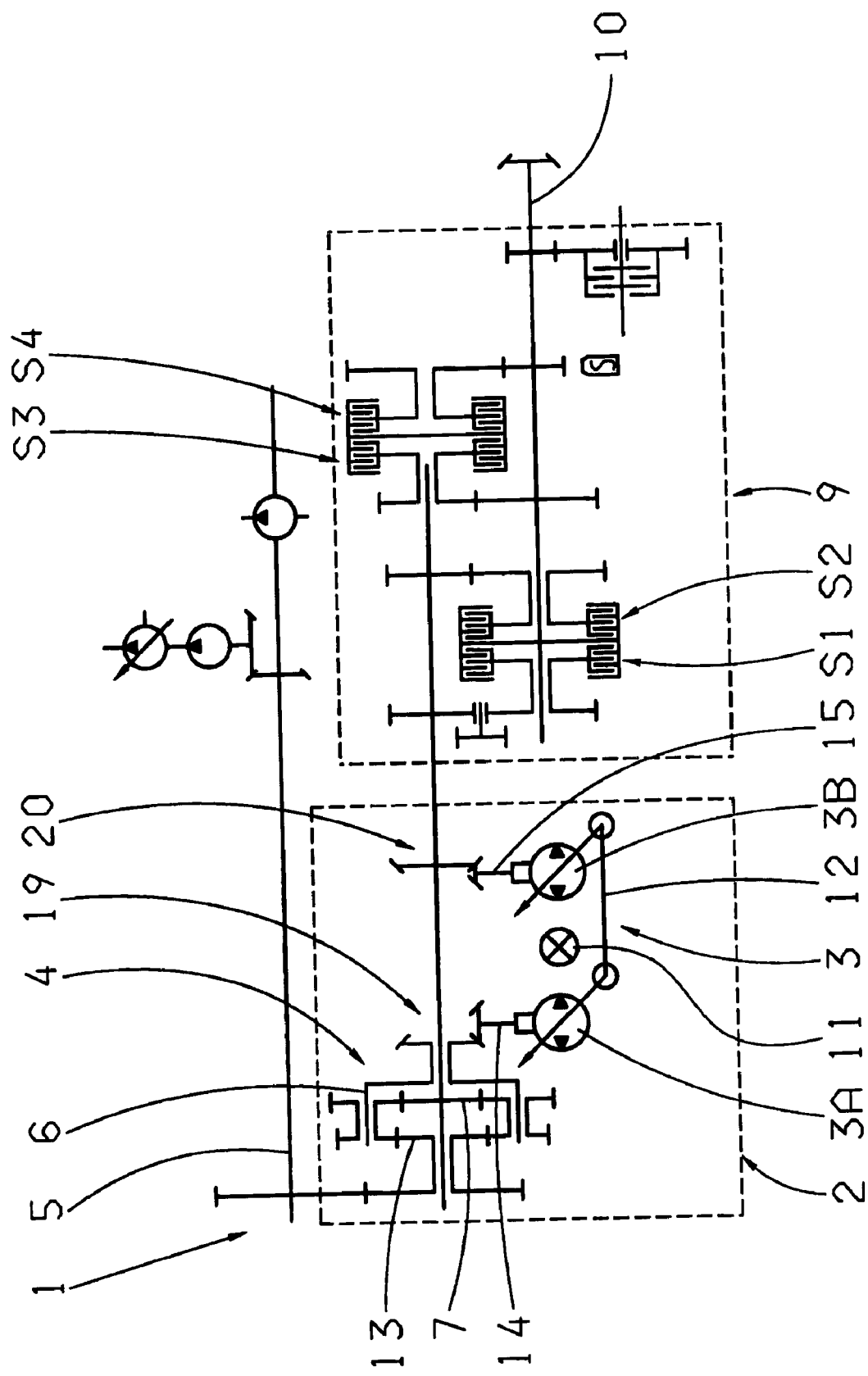
FIG. 5 a gear diagram of a third exemplary embodiment of the transmission device according to the present invention.

As the second exemplary embodiment of the transmission device 1 shown in FIG. 5 possibly requires too much installation space in the radial direction, the variator can be spatially arranged between the planetary gear unit 4 and the manual gear unit 9 in order to reduce the required radial installation space of the transmission device 1. The thus extended axial space requirements of the transmission device 1 are mostly available in the region of the drive train of agricultural vehicles, whereas the installation space is frequently limited in the radial direction, and therefore the above described arrangement of the variator 3 next to the planetary gear set and/or the manual gear unit 9 is not possible.

Figure 6:
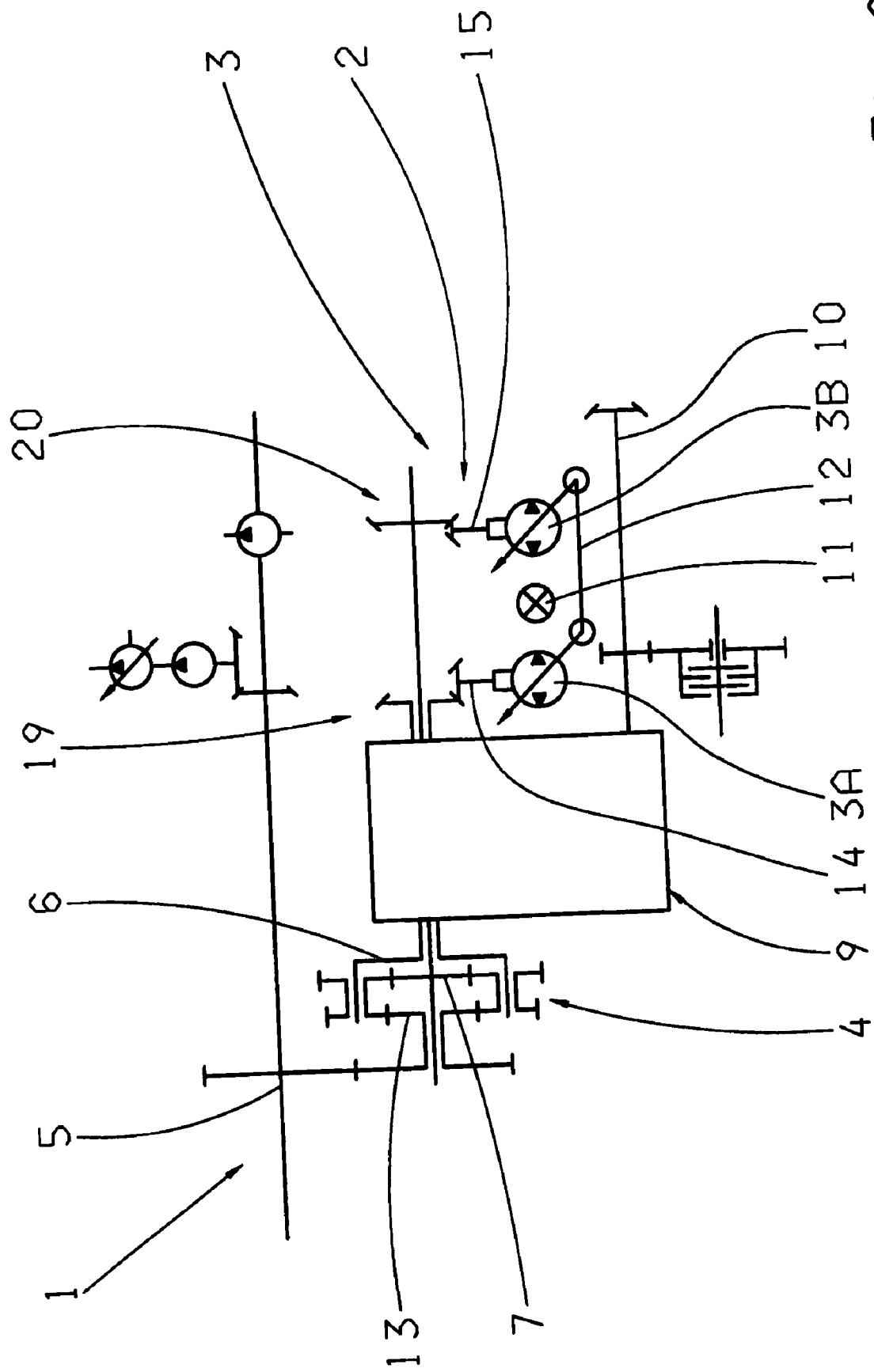
FIG. 6 a gear diagram of a fourth exemplary embodiment of the transmission device according to the present invention.

Alternatively, in the exemplary embodiment of the transmission device 1 in the forward driving direction X shown in FIG. 6, the variator 3 is spatially positioned behind the manual gear unit 9, so that the manual gear unit 9 is arranged between the planetary gear set 4 and the variator 3, the transmission device 1 requires less installation space in the radial direction.

REFERENCE NUMERALS 1 transmission device
2 continuously variable drive set
3 variator
3A pump means
3B motor means
4 planetary gear set
5 transmission input shaft
6 shaft, planetary carrier
7 shaft, sun gear
8 spur gear
9 manual gear unit
10 transmission output shaft
11 pivot axis
12 yoke
13 second sun gear
14,15 variator shaft
16 vehicle vertical axis
17 vehicle frame
18 oil level
19,20 angle drive
S1 to S4 shift element
X forward driving direction

The invention claimed is:

1. A transmission device (1) for a vehicle, the transmission device (1) comprising:
a variator (3) configured as a hydrostatic device in a transverse axis construction that is adjustable at least in a region of a pivot axis (11),
a planetary gear set (4), and
a manual gear unit (9),
an orientation of the pivot axis (11) of the variator (3), following installation in the vehicle, at least substantially corresponding to an orientation of a vertical axis of the vehicle (16),
a pump unit (3A) and a motor unit (3B) of the variator (3) being coupled to one another for mutual adjustment, and the pump unit (3A) being continuously connected to a planet carrier (6) of the planetary gear set (4).

2. The transmission device according to claim 1, wherein the variator (3), following installation in the vehicle, is spatially arranged between a main engine of the vehicle and the planetary gear set (4) and the manual gear unit (9).

3. The transmission device according to claim 1, wherein the variator (3) is spatially arranged between the planetary gear set (4) and the manual gear unit (9).

4. The transmission device according to claim 2, wherein the manual gear unit (9) is spatially arranged between the planetary gear set (4) and the variator (3).

5. The transmission device according to claim 1, wherein the variator (3), following installation in the vehicle, is spatially arranged adjacent to at least one of the planetary gear set (4) and the manual gear unit (9) relative a vehicle driving direction.

6. The transmission device according to claim 1, wherein the variator (3) is connected, via respective angle drives (19, 20), to a first shaft of the planetary gear set in a region of a first shaft (14) and to a second shaft of the planetary gear set in a region of a second shaft (15).

7. The transmission device according to claim 1, wherein the pump unit (3A) is rotationally non-variably connected to a planet carrier (6) of the planetary gear set (4).

8. A transmission device (1) for a vehicle, the transmission device (1) comprising:
a variator (3) configured as a hydrostatic device with a transverse axis construction that is adjustable at least in a region of a pivot axis (11),
a planetary gear set (4) having first and second sun gears (7, 13) and a common planet carrier (6) coupled with both the first and the second sun gears (7, 13);
a manual gear unit (9),
an orientation of the pivot axis (11) of the variator (3), following installation in the vehicle, at least substantially corresponds to an orientation of a vertical axis of the vehicle (16), and
a pump unit (3A) and a motor unit (3B) of the variator (3) being coupled to one another for mutual adjustment and the pump unit (3A) being continuously connected to the planet carrier (6).

9. The transmission device according to claim 8, wherein the motor unit (3B) is rotationally non-variably connected to one of the first and the second sun gears (7, 13).

10. The transmission device according to claim 8, wherein the variator (3), following installation in the vehicle, is arranged between a main engine of the vehicle and the planetary gear set (4) and the manual gear unit (9).

11. The transmission device according to claim 8, wherein the variator (3) is arranged between the planetary gear set (4) and the manual gear unit (9).

12. The transmission device according to claim 8, wherein the manual gear unit (9) is arranged between the planetary gear set (4) and the variator (3).

13. The transmission device according to claim 8, wherein the variator (3), following installation in the vehicle, is arranged adjacent to at least one of the planetary gear set (4) and the manual gear unit (9) relative a vehicle driving direction.

14. The transmission device according to claim 8, wherein the variator (3) is connected, via respective angle drives (19, 20), to a first shaft of the planetary gear set in a region of a first shaft (14) and to a second shaft of the planetary gear set in a region of a second shaft (15).

15. The transmission device according to claim 8, wherein the pump unit (3A) is rotationally non-variably connected to a planet carrier (6) of the planetary gear set (4).

16. The transmission device according to claim 8, wherein a first angled drive (19) directly connects a first variator shaft (14) of the variator (3) to a first shaft (6) of the planetary gear set, and
a second angled drive (20) directly connects a second variator shaft (15) of the variator (3) to one of a second shaft (7) of the planetary gear set (4) and a spur gear (8) that directly engages with the second shaft (7) of the planetary gear set.

17. The transmission device according to claim 16, wherein the second shaft (7) of the planetary gear set (4) forms an input shaft to the manual gearbox unit (9).

* * * * *